United States Patent [19]
Mori

[11] Patent Number: 5,186,273
[45] Date of Patent: Feb. 16, 1993

[54] REAR WHEEL STEERING SYSTEM FOR AUTOMOTIVE VEHICLE

[75] Inventor: Kazunori Mori, Ebina, Japan

[73] Assignee: Nissan Motor Co., Ltd., Yokohama, Japan

[21] Appl. No.: 676,120

[22] Filed: Mar. 27, 1991

[30] Foreign Application Priority Data

Mar. 28, 1990 [JP] Japan ........................... 2-76699

[51] Int. Cl.$^5$ ............................. B62D 5/06
[52] U.S. Cl. ........................ 180/140; 364/424.05; 180/141
[58] Field of Search ............ 180/140, 141; 280/91; 364/424.05

[56] References Cited

U.S. PATENT DOCUMENTS

| 4,582,334 | 4/1986 | Tashiro et al. | 280/91 |
| 4,700,960 | 10/1987 | Miki et al. | 180/140 X |
| 4,811,805 | 3/1989 | Yoshida et al. | 180/140 |
| 4,893,690 | 1/1990 | Mori et al. | 180/140 |
| 5,003,480 | 3/1991 | Mori et al. | 180/140 X |
| 5,018,070 | 5/1991 | Eguchi | 364/424.05 |
| 5,019,982 | 5/1991 | Furukawa | 180/140 X |

FOREIGN PATENT DOCUMENTS

| 209117 | 1/1987 | European Pat. Off. . |
| 0363846A2 | 6/1989 | European Pat. Off. . |
| 0350019 | 1/1990 | European Pat. Off. . |
| 0363846 | 4/1990 | European Pat. Off. . |
| 3337311 | 4/1984 | Fed. Rep. of Germany . |
| 3637996 | 5/1987 | Fed. Rep. of Germany . |
| 63-287676 | 11/1988 | Japan . |
| 63287 | 3/1989 | Japan . |
| 1-41176 | 6/1989 | Japan ........................ 180/140 |
| 2-45273 | 2/1990 | Japan . |

Primary Examiner—David M. Mitchell
Assistant Examiner—Kevin Hurley
Attorney, Agent, or Firm—Foley & Lardner

[57] ABSTRACT

An automotive vehicle rear wheel steering system steers the rear wheels in accordance with front wheel steering, with a steering angle which corresponds to the sum of proportional and differential components of the front wheel steering amount. A detecting unit detects a front wheel large steering condition in which the front wheels have been steered with an amount in excess of a preset value. A correction unit corrects at least one of the above-mentioned components in the front wheel large steering condition, in such direction as to improve transient turning response characteristic of the vehicle. An actuator unit steers the rear wheels by a steering angle based on at least one component which has been corrected in the large front wheel steering condition. The turning-round property and maneuverability of the vehicle can be prevented from degradation despite the rear wheel steering under the front wheel large steering condition.

8 Claims, 11 Drawing Sheets

FIG_2

FIG_7

FIG_8

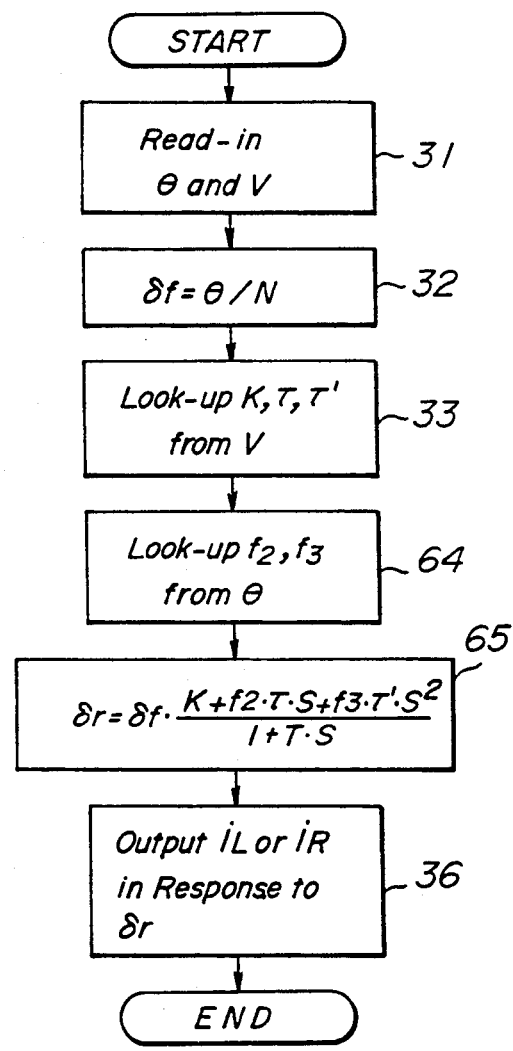
FIG_10
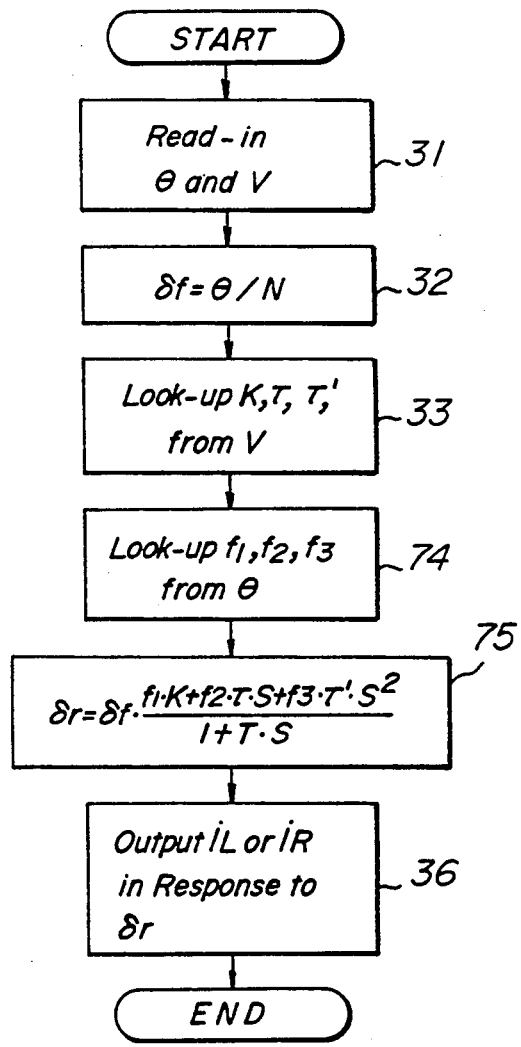
FIG_11

5,186,273

REAR WHEEL STEERING SYSTEM FOR AUTOMOTIVE VEHICLE

BACKGROUND OF THE INVENTION

1. Field of the Invention

The present invention relates to a rear wheel steering system for an automotive vehicle.

2. Description of the Prior Art

A rear wheel steering system for an automotive vehicle is to steer the rear wheels in accordance with the front wheel steering, for the purpose of allowing a small turn and improving the turning stability of the vehicle. Various kinds of rear wheel steering systems have been conventionally proposed and disclosed, for example, in Japanese Patent Application Laid-open Publication No. 63-287,676. Here, the rear wheel steering angle $\delta_r$ is determined in accordance with the following equation:

$$\frac{\delta_r}{\delta_f} = \frac{K + \tau \cdot S + \tau' \cdot S^2}{1 + T \cdot S} \quad (1)$$

where
- $\delta_f$: Front wheel steering angle
- T: first order delay time constant of rear wheel steering system
- K: proportional constant
- $\tau$: first order differential constant
- $\tau'$: second order differential constant
- S: complex variable In the known control of the rear wheel steering angle described above, the proportional constant K determines a same-phase component of the rear wheel steering in the same direction as as the front wheel steering, which is a proportional component contributing to improve the turning stability in a steady state, while the differential constants $\tau$ and $\tau'$ determine an opposite-phase component of the rear wheel steering in the opposite direction to the front wheel steering, which, in turn, is a differential component contributing to improve the transient turning response characteristic.

In this case, the rear wheel steering control constants K, $\tau$ and $\tau'$ are respectively determined only as the function of a vehicle speed V which achieves a front and rear wheel steering angle ratio $\delta_r/\delta_f$ shown, for example, in FIG. 12, and are fixed with reference to the front wheel steering angle. Therefore, despite the fact that a large front wheel steering angle is an indication of requirement of a large turning amount of the vehicle, when the rear wheel steering is performed regardless of the front wheel large steering condition, the proportional component determining the same-phase steering amount of the rear wheel tends to inhibit the turning property of the vehicle, thereby making a desired steering operation difficult contrary to the driver's demand.

It is widely known, particularly in the case of a front wheel drive vehicle, that the vehicle exhibits an understeering tendency when it is turned round while being simultaneously accelerated, due to a reduced ground contact area of the front wheel tires as a result of decrease in the load applied thereto, and also due to a relatively small side force generated during the turning of the vehicle by the front wheel tires which are applied with driving force.

The rear wheel steering technology described above is essentially to steer the rear wheels in the same phase as the front wheel steering, with an increased same-phase component based on the proportional component, though the same-phase rear wheel steering enhances the understeering tendency upon simultaneous turning and acceleration of a front wheel drive vehicle. This means that, when a front wheel drive vehicle is accelerated and turned round under a front wheel large steering condition, the resulting enhanced understeering tendency makes it extremely difficult for a driver to properly steer the vehicle as intended.

SUMMARY OF THE INVENTION

Consequently, it is an object of the present invention is to eliminate the above-mentioned problems by providing an improved rear wheel steering system which takes into consideration driver's demand for a sufficient turning property of the vehicle in a front wheel large steering condition, and corrects the rear wheel steering angle to meet the driver's demand.

To this end, according to the present invention, there is provided a rear wheel steering system for an automotive vehicle wherein steering of rear wheels is conducted in accordance with a front wheel steering, with a steering angle which corresponds to sum of proportional and differential components of an amount of the front wheel steering, the rear wheel steering system comprising: a detecting means for detecting a front wheel large steering condition in which the front wheels have been steered with an amount in excess of a preset value; a correction means responsive to the detecting means, for correcting at least one of the proportional component and the differential component in the front wheel large steering condition, in such direction as to improve transient turning response characteristic of the vehicle; and an actuator means responsive to the correction means, for steering the rear wheels by a steering angle based on said at least one of the components which has been corrected by the correcting means in the large front wheel steering condition.

Thus, when the front wheels of a vehicle are steered, the rear wheel steering system according to the present invention serves to steer the rear wheels by an angle which corresponds to the sum of proportional and differential components each depending upon the front wheel steering amount, so as to improve the steady turning stability and the transient turning response characteristic by the proportional and differential components, respectively.

When, furthermore, the front wheel steering amount exceeds a preset value, the correction means is supplied with a signal from the detecting means indicating the front wheel large steering condition, and corrects the proportional component and/or differential component so as to improve the transient turning response characteristic of the vehicle. Thus, even under a front wheel large steering condition, the rear wheel steering operation does not significantly degrade the turning-round property and maneuverability of the vehicle against the driver's demand, and a satisfactory transient performance of the vehicle can be ensured in conformity with the driver's intention.

BRIEF DESCRIPTION OF THE DRAWINGS

FIG. 10 and FIG. 11 are flow charts similar to FIG. 4, showing other examples of the control program executed by the controller shown in FIG. 3.

DETAILED EXPLANATION OF THE PREFERRED EMBODIMENTS

The present invention will now be explained in detail by referring to some preferred embodiments shown in the accompanying drawings.

Figure 1:
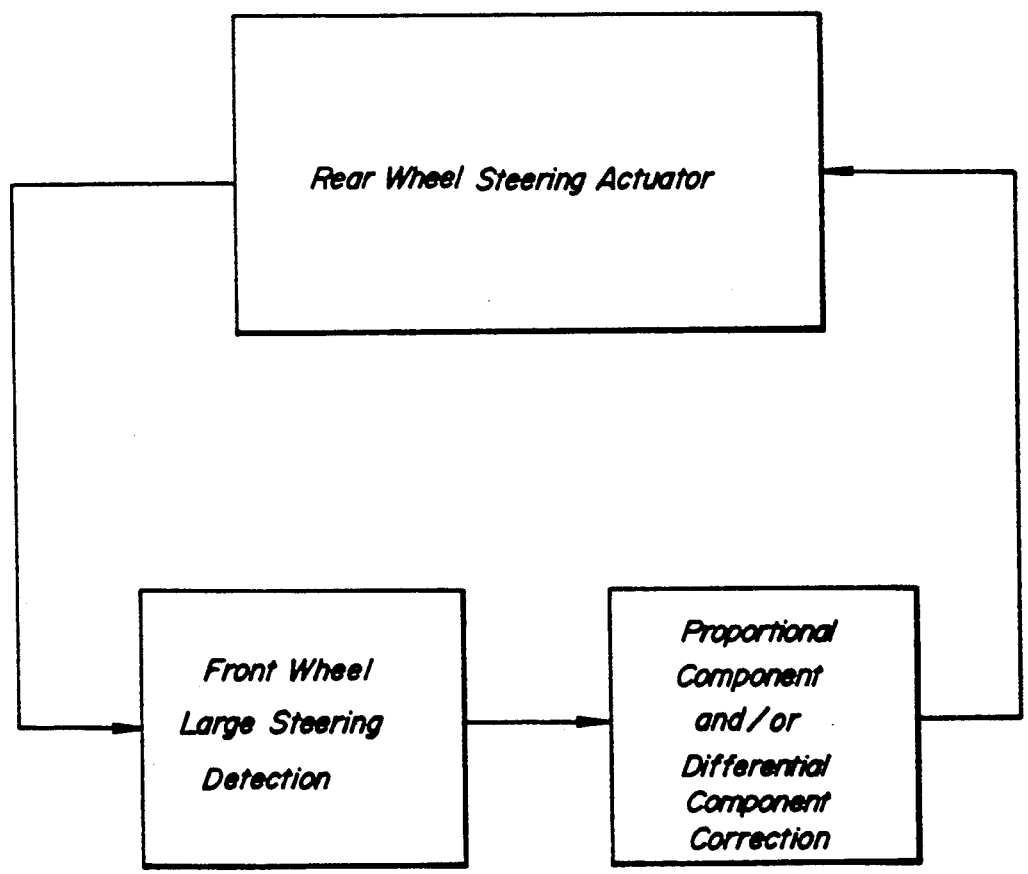
FIG. 1 is a schematic illustration showing the basic concept of the rear wheel steering system according to the present invention.

As schematically shown in FIG. 1 and briefly mentioned hereinbefore, the present invention provides an improved rear wheel steering system for an automotive vehicle wherein steering of the rear wheels is conducted in response to the front wheel steering, with a steering angle which corresponds to the sum of the proportional and differential components of the front wheel steering amount. The system includes a detecting unit for detecting a front wheel large steering condition in which the front wheels have been steered with an amount in excess of a preset value, a correction unit for correcting at least one of the proportional component and the differential component, under a large front wheel steering condition, in such direction as to improve transient turning response characteristic of the vehicle, and an actuator unit for steering the rear wheels by a steering angle based on at least one of the components which has been corrected by the correcting unit in the front wheel large steering condition.

Figure 2:
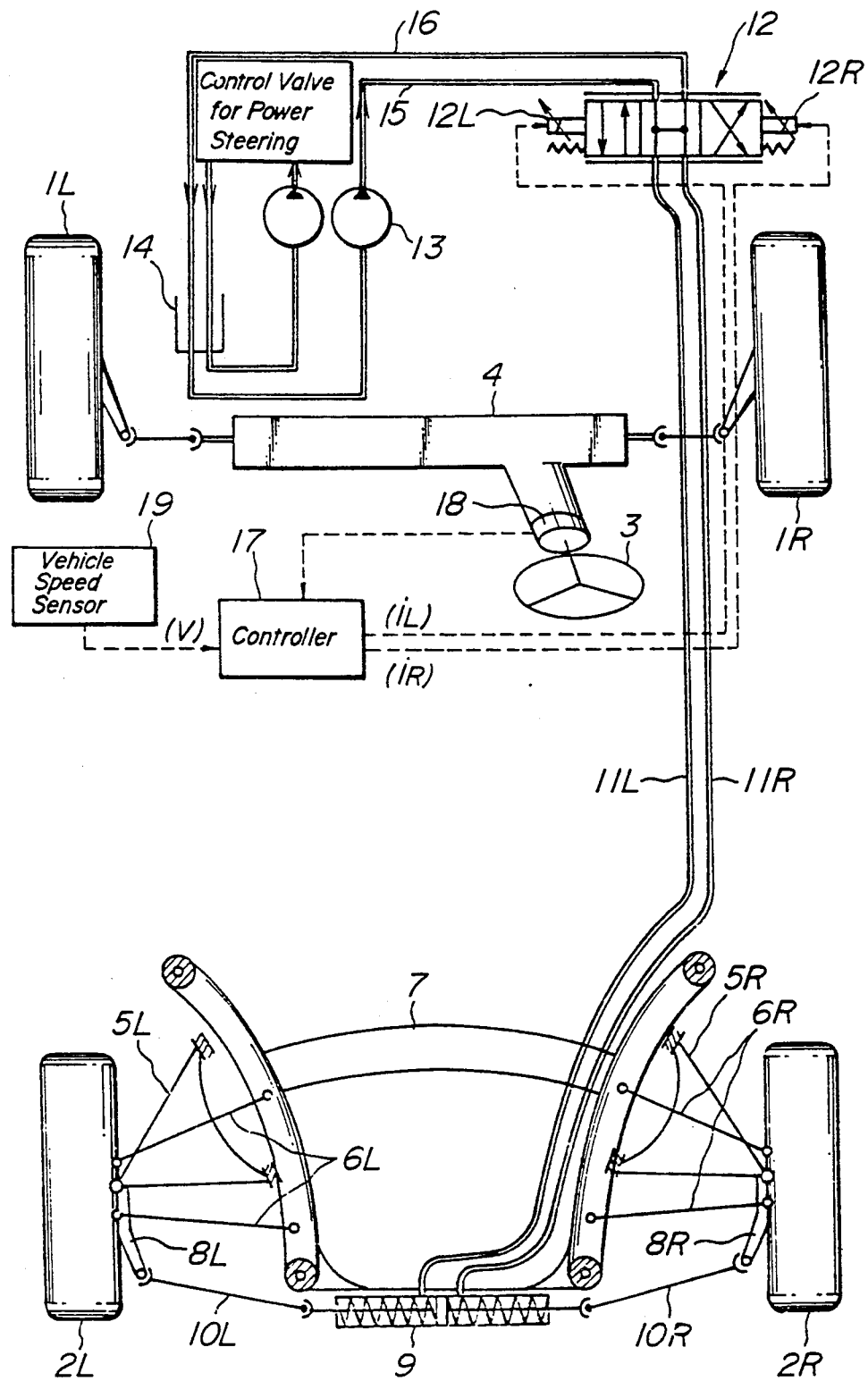
FIG. 2 is a schematic illustration which shows one example of the steering system of a four-wheel-steering vehicle to which the present invention can be applied.

FIG. 2 shows one example of a four-wheel-steering (4WS) vehicle to which the rear wheel steering system according to the present invention can be applied. The vehicle includes left and right front wheels 1L, 1R, which are driving wheels, and left and right rear wheels 2L, 2R. The front wheels 1L and 1R are steered by a steering wheel 3 through a steering gear assembly 4 in a conventional manner. The rear wheels 2L, 2R are suspended by a rear wheel suspension device including transverse links 5L, 5R and upper arms 6L, 6R, and are connected to a rear suspension member 7 of the vehicle body. In order to permit steering of the rear wheels 2L and 2R, knuckle arms 8L, 8R of the rear wheels are connected with each other by an actuator 9 and side rods 10L, 10R on both ends of the actuator 9.

The actuator 9 in the illustrated example is a spring-center type double-acting hydraulic cylinder having left and right pressure chambers which are connected, through left and right fluid passages 11L, 11R, with an electromagnetic proportional pressure control valve 12, respectively. Furthermore, the actuator 9 is operated by a hydraulic fluid pressure which is supplied from a pressure source including a pump 13 and a reservoir tank 14. Thus, the control valve 12 is further connected with a pressure supply passage 15 leading from the pump 13, and also with a drain passage 16 leading to the reservoir tank 14.

The control valve 12 in the illustrated example is a spring-center type three-position valve having left and right solenoids 12L, 12R. When both solenoids 12L, 12R are deenergized or turned off, the control valve 12 holds each fluid passage 11L, 11R at a non-pressurized state. When the left solenoid 12L is energized or turned on by electric current $i_L$, a pressure proportional to the current $i_L$ is supplied to the left fluid passage 11L and to the left pressure chamber of the actuator 9, so that the rear wheels 2L, 2R are steered to left by an angle corresponding to the supplied pressure. When, on the other hand, the right solenoid 12R is energized or turned on by electric current $i_R$, a pressure proportional to the current $i_R$ is supplied to the right fluid passage 11R and to the right pressure chamber of the actuator 9, so that the rear wheels 2L, 2R are steered to right by an angle corresponding to the supplied pressure.

Figure 3:
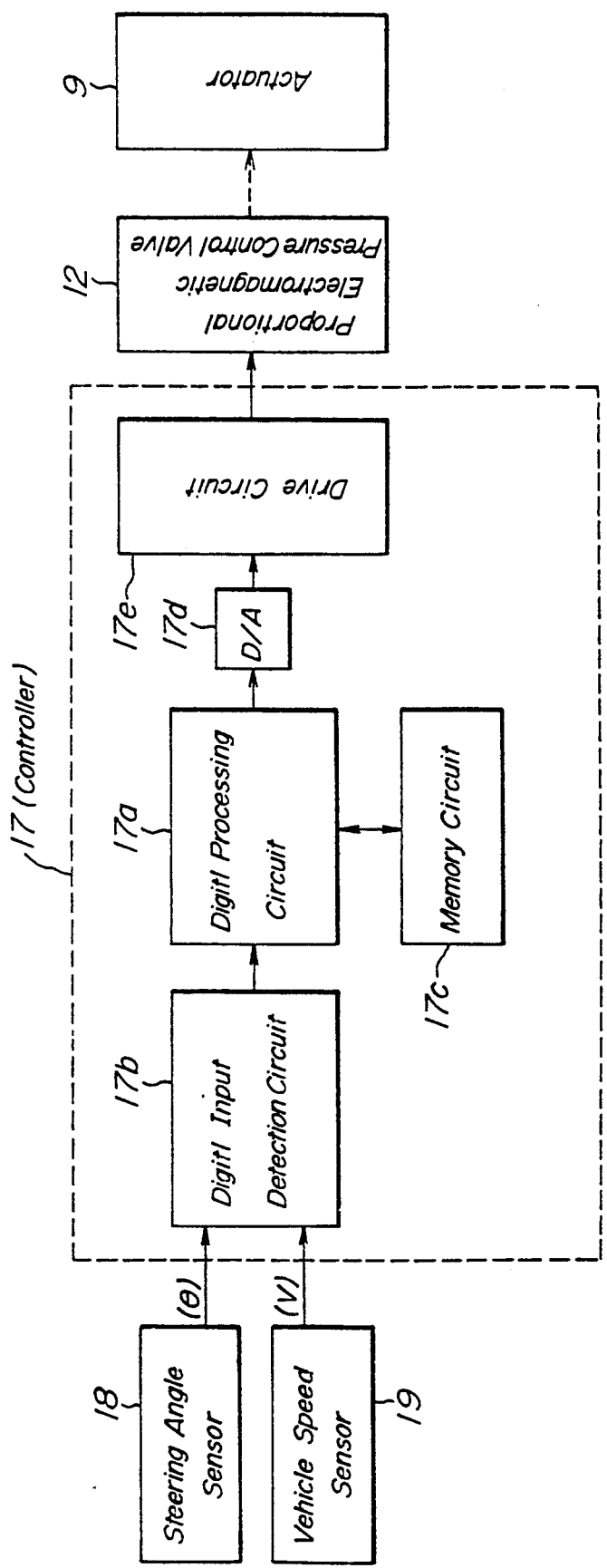
FIG. 3 is block diagram of a controller included in the steering system shown in FIG. 2.

There is provided a controller 17 which serves to carry out an electronic control of the rear wheel steering angle by turning on and off the solenoids 12L, 12R and controlling the intensity of the electric currents $i_L$, $i_R$ which are supplied to the solenoids 12L, 12R. As shown in FIG. 3, the controller 17 includes a digital processing circuit 17a, a digital input detecting circuit 17b, a memory circuit 17c, a D/A converter 17d and a driving circuit 17e. The input detecting circuit 17b is supplied with a signal from a steering angle sensor 18 which detects the operating angle $\theta$ of the steering wheel 3. The input detecting circuit 17b is further supplied with a signal from a vehicle speed sensor 19 which detects the vehicle speed V. The digital processing circuit 17a executes a control program shown in FIG. 4 based on the input signals supplied to the detecting circuit 17b and the information previously stored in the memory circuit 17c, and generates a digital output signal which is converted into an analog signal by the D/A converter 17d, and then supplied to the driving circuit 17e. The driving circuit 17e is adapted to provide the electric currents $i_L$, $i_R$ of a desired intensity for controlling the steering of the rear wheels 2L, 2R.

Figure 4:
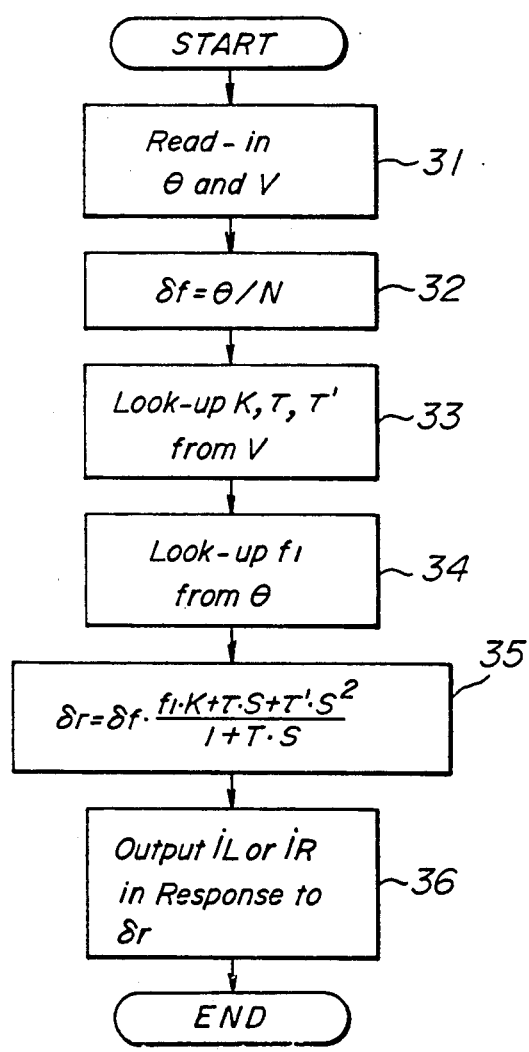
FIG. 4 is a flow chart showing one example of the control program executed by the controller shown in FIG. 3.

Referring now to FIG. 4, the steering wheel operating angle $\theta$ and the vehicle speed V are read-in in the step 31, and the front wheel steering angle $\delta_f$ is calculated in the next step 32 according to the following equation:

$$\delta_f = \frac{\theta}{N} \quad (2)$$

where N is a steering gear ratio.

Figure 12:
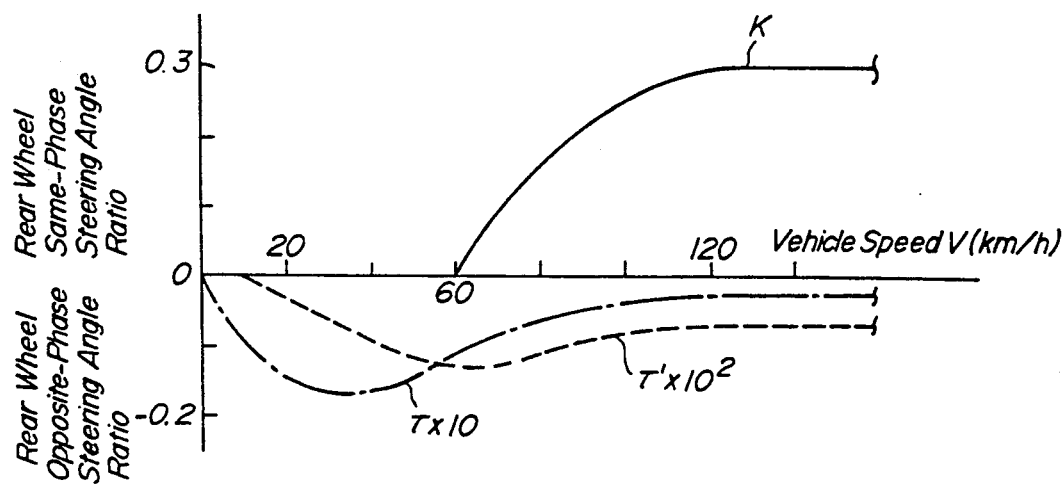
FIG. 12 is a characteristic diagram showing the variation of a conventional rear wheel steering control constant.

In the next step 33, the proportional constant K and the differential constants $\tau$, $\tau'$ shown in FIG. 12 are calculated or looked-up according to the vehicle speed V. The proportional component $\delta_{rk}$ of the rear wheel steering angle $\delta_r$ is determined by the proportional constant K, which is always positive in this example. It is apparent from the equation (1) explained hereinbefore, that the proportional component $\delta_{rk}$ corresponding to the front wheel steering angle $\delta_f$ becomes the same-phase rear wheel steering angle. On the other hand, the differential component of the rear wheel steering angle $\delta_r$ is determined by differential constants $\tau, \tau'$, which are negative in this example. It is also apparent from the equation (1), that the differential component becomes the opposite-phase rear wheel steering angle in accordance with the varying speed and acceleration of the front wheel steering angle $\delta_f$.

Figure 5:
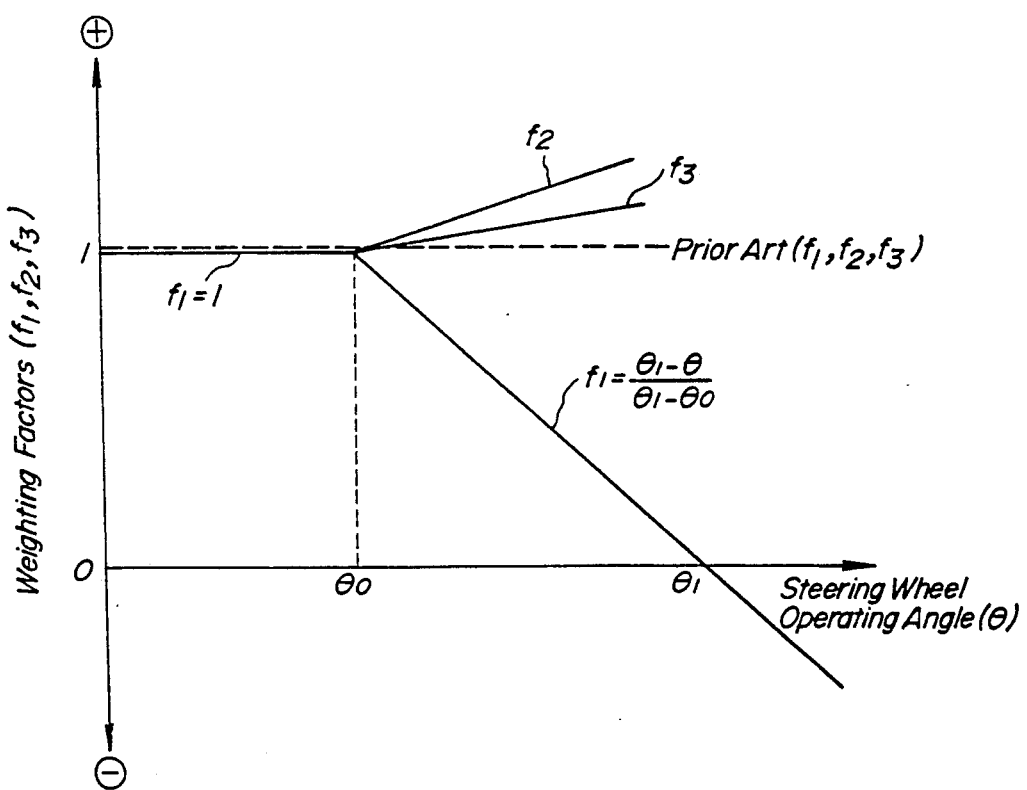
FIG. 5 is a characteristic diagram showing one example of the variation of weighting factors with regard to the proportional and differential components of the rear wheel steering.

In the next step 34, the weighting factor $f_1$ is looked-up with the steering wheel operating angle $\theta$ according to the table data corresponding to FIG. 5. The weighing factor $f_1$ is used to correct the proportional component corresponding to the proportional constant K, as will be explained with reference to the next step 35. In a front wheel large steering condition wherein the steering wheel operating angle $\theta$ exceeds a preset value $\theta_0$, as shown in FIG. 5, the value of the weighting factor $f_1$ gradually decreases from 1 in response to increase in the steering wheel operating angle $\theta$, and becomes negative upon further increase of the operating angle $\theta$ in the region of $\theta > \theta_1$. In the region of front wheel large steering condition corresponding to $\theta > \theta_0$, the weighting factor $f_1$ as a function of the steering wheel operating angle $\theta$ can be expressed by the following equation:

$$f_1 = \frac{\theta_1 - \theta}{\theta_1 - \theta_0} \quad (3)$$

In the step 35, the rear wheel steering angle $\delta_r$ is calculated by the following equation wherein the proportional constant K is multiplied by the weighting factor $f_1$:

$$\delta_r = \delta_f \cdot \frac{f_1 \cdot K + \tau \cdot S + \tau' \cdot S^2}{1 + T \cdot S} \quad (4)$$

In the next step 36, the electric current $i_L$ or $i_R$ corresponding to the calculated rear wheel steering angle $\delta_r$ is supplied to the control valve 12 in FIG. 2 so that the rear wheels 2L, 2R can be steered in accordance with the result of calculation.

By the way, as mentioned above, the proportional component $\delta_{rk} = \delta_f \cdot K$ of the rear wheel steering angle $\delta_r$ as determined by the proportional constant K is multiplied by the weighing factor $f_1$ which is determined as shown in FIG. 5. Accordingly, with increase in the steering wheel operating angle $\theta$ under a front wheel large steering condition wherein the steering wheel 3 is operated with an angle $\theta$ which is equal to or greater than the preset value $\theta_0$, the proportional component $\delta_{rk}$ of the rear wheel steering angle with regard to the steering wheel operating angle $\theta$ as shown by solid line in FIG. 6 becomes smaller than a conventional one whose same-phase steering amount is shown by broken line in FIG. 6, and eventually changes to an opposite-phase steering angle in the range of $\theta > \theta_1$. Incidentally, the proportional component $\delta_{rk}$ shown by the solid line in FIG. 6 may be expressed by the following equation:

$$\delta_{rk} = f_1 \cdot \frac{\theta}{N} \cdot K \quad (5)$$
$$= \frac{\theta_1 - \theta}{\theta_1 - \theta_0} \cdot \frac{\theta}{N} \cdot K$$

$$= \frac{K}{N} \cdot \left( \frac{1}{\theta_1 - \theta_0} \right) \left( - \left( \theta - \frac{\theta_1}{2} \right)^2 + \frac{\theta_1^2}{4} \right)$$

Therefore, when the steering system is set in the front wheel large steering condition corresponding to $\theta > \theta_0$, the same-phase steering angle of the proportional component $\delta_{rk}$ with regard to the front wheel steering angle $\delta_f$ becomes relatively small as the latter angle is increased, and the proportional component $\delta_{rk}$ changes into an opposite phase upon further increase of the front wheel steering angle $\delta_f$. Consequently, as the front wheel steering angle $\delta_f$ is increased based on a driver's demand for a sufficient turning-round property, the same-phase component of the rear wheel steering angle $\delta_r$ given by the equation (4) above is made relatively small, and is eventually changed into an opposite-phase component. For that reason, even under a front wheel large steering condition, the present invention makes it possible to realize an improved transient turning response characteristic of the vehicle, thereby maintaining sufficient turning-round property and maneuverability of the vehicle in compliance with the driver's demand, without being adversely affected by the rear wheel steering.

In the range of $\theta > \theta_0$ which is for a front wheel ordinary steering condition wherein the rear wheel steering is not influential on the transient turning response characteristic of the vehicle, the value of the weighting factor $f_1$ is fixed to 1, so that the proportional component $\delta_{rk}$ of the rear wheel steering angle $\delta_r$ is set to a constant value as obtained from the equation (1) above, without being subjected to a correction, thereby providing a desired improved turning stability of the vehicle.

Figure 6:
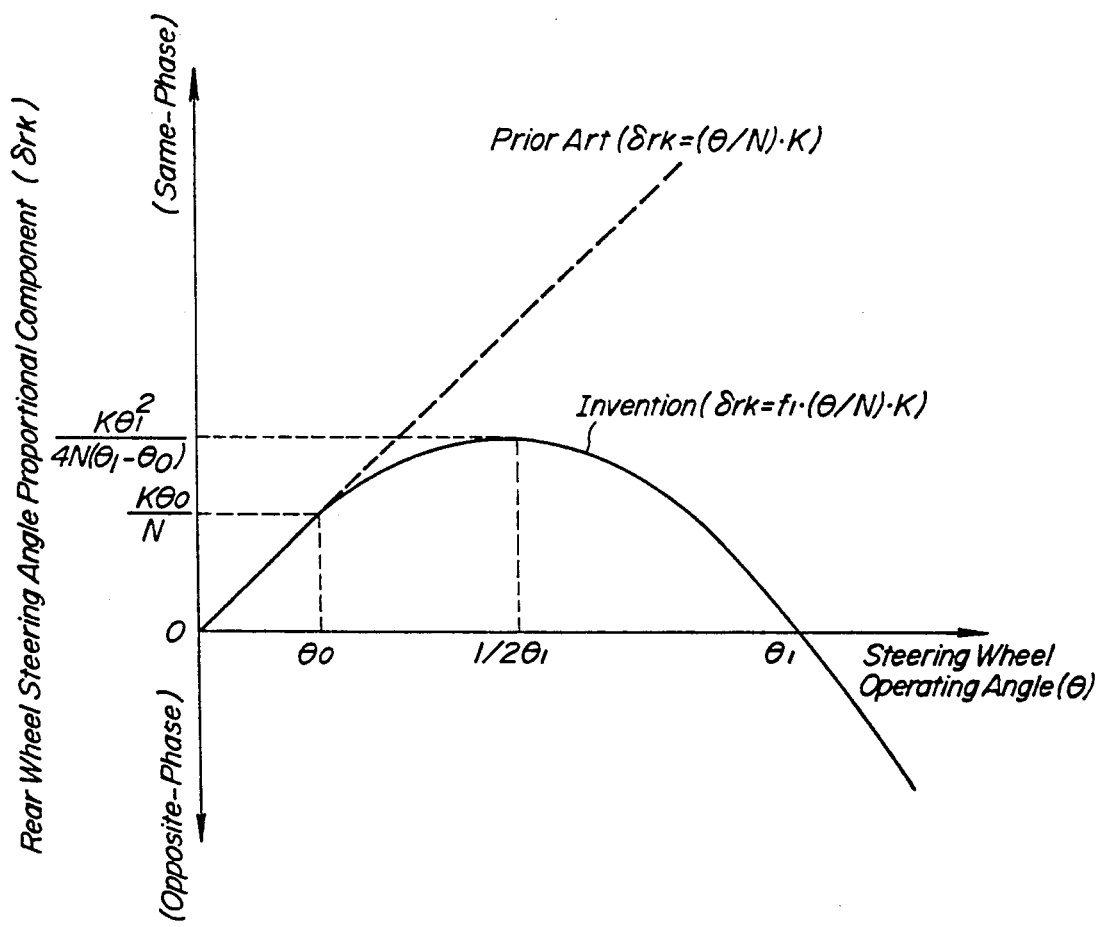
FIG. 6 is a characteristic diagram showing the corrected proportional component of the rear wheel steering angle in the example of FIG. 5.
Figure 7:
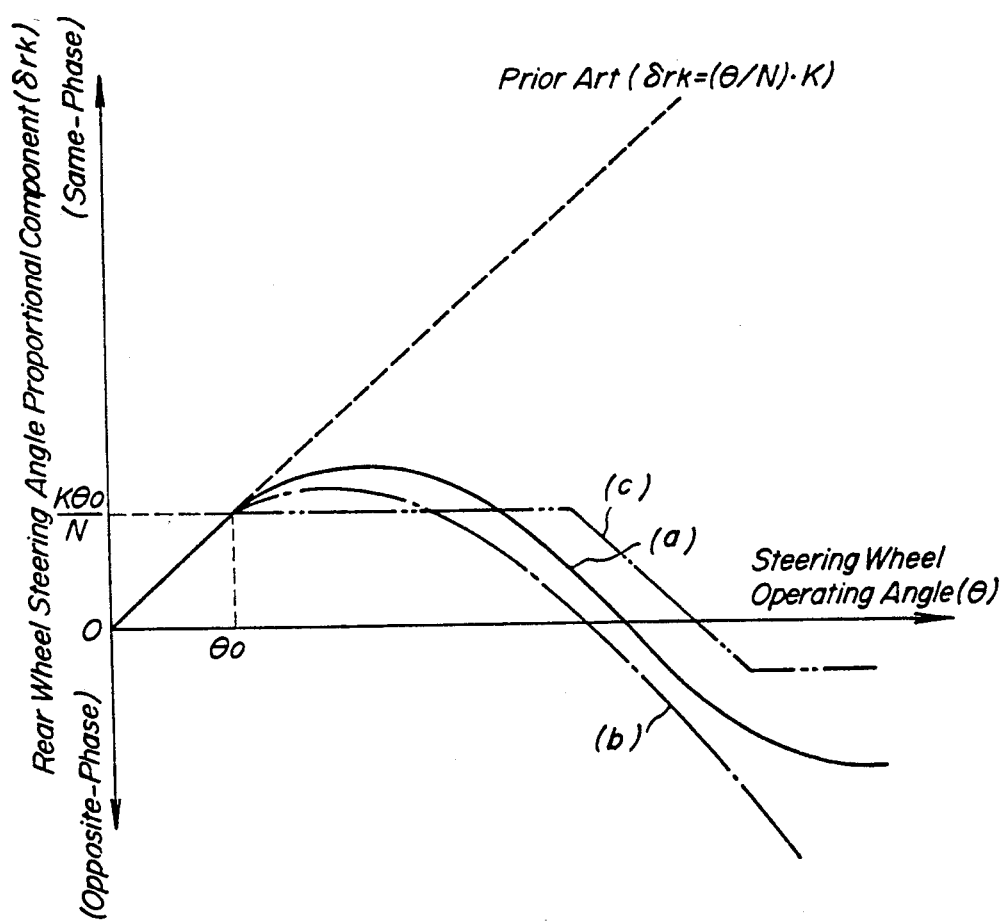
FIG. 7 is a characteristic diagram showing three different examples of the proportional component correction.

When the proportional component $\delta_{rk}$ is corrected according to a parabolic shape as shown in FIG. 6 for achieving the intended functions as mentioned above, the degree of design freedom may be insufficient or the desired functions may not be fully achieved, depending upon the intended performance specification and characterization of the vehicle. On such occasion, the weighting factor $f_1$ may be expressed by a curve instead of a straight line shown in FIG. 5. In this case, depending upon the manner of determining the weighting factor $f_1$, the proportional component $\delta_{rk}$ of the rear wheel steering angle $\delta_r$ may be arbitrarily corrected according to any one of the solid line (a), one-dotted chain line (b) or two-dotted chain line (c) shown in FIG. 7.

Figure 8:
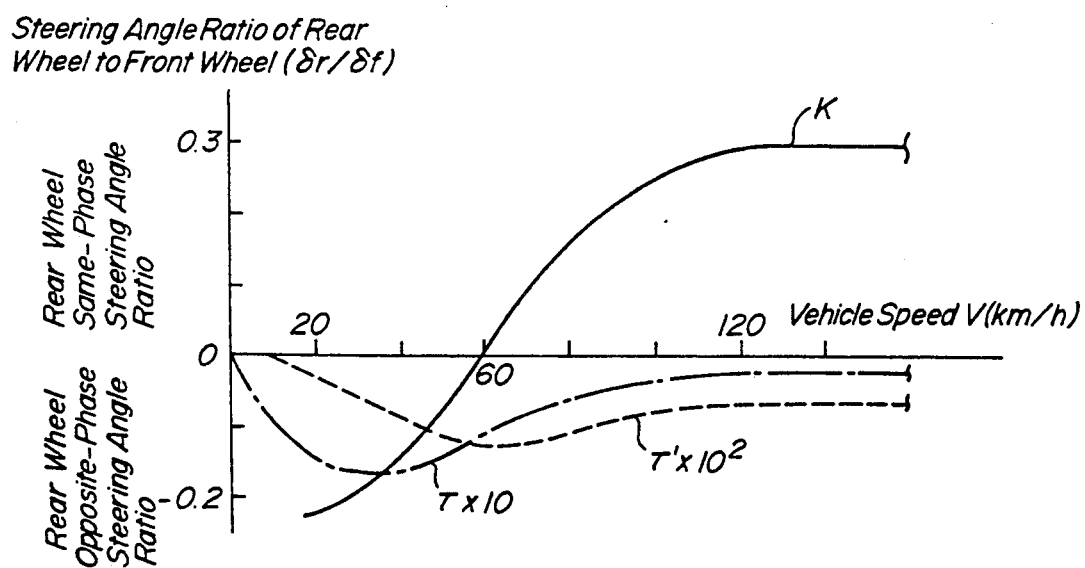
FIG. 8 and FIG. 9 are characteristic diagrams showing the variations of a specific rear wheel steering angle control constant and weighing factors.
Figure 9:
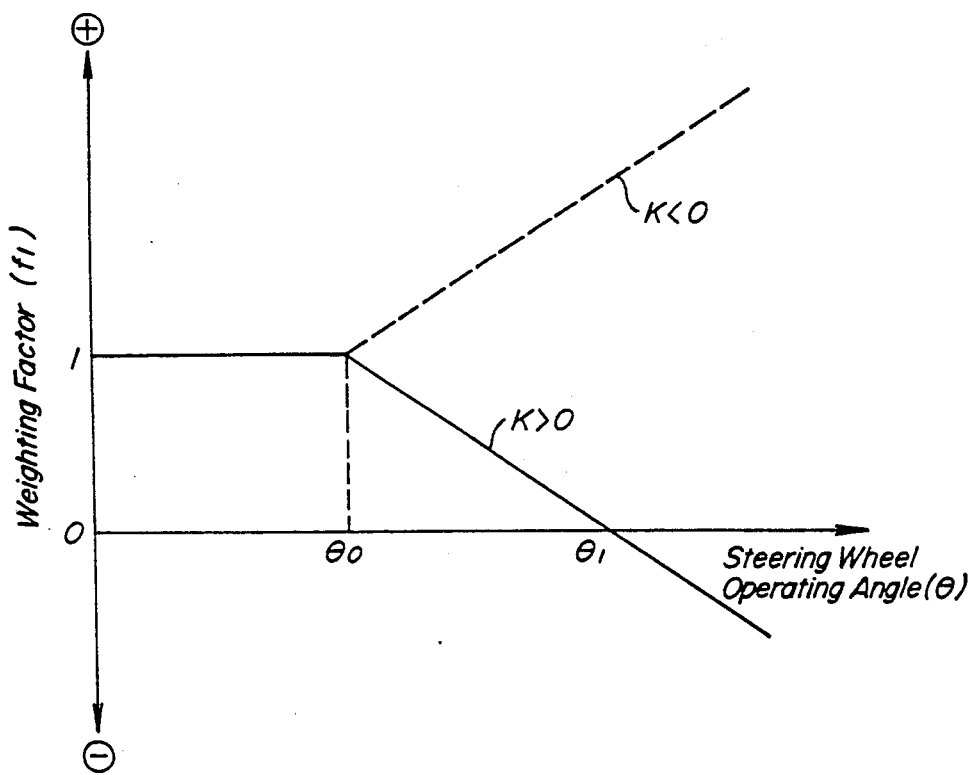

When the proportional constant K has a negative region as shown in FIG. 8, as the case may be, it is necessary to correct the proportional component $\delta_{rk}$ in a direction in which the weighting factor $f_1$ contributes to improve the turning-round property of the vehicle upon increase in the front wheel steering angle or in the steering wheel operating angle $\theta$. For that reason, as shown in FIG. 9, it is a matter of course that when the weighting factor $f_1$ for the positive region of the proportional constant K (K>0) is determined in accordance with a linearly decremental characteristic line similar to that shown in FIG. 5, the weighting factor $f_1$ for the negative region of the proportional constant K (K<0) should be determined in accordance with a symmetrical or linearly incremental characteristic line.

In the examples described above, the rear wheel steering is prevented from degrading the turning-round property and the maneuverability of the vehicle even under a front wheel large steering angle condition, by appropriately correcting the proportional component $\delta_{rk}$ according to the weighting factor $f_1$. Instead of the method described above, or in addition thereto, substantially the same functions can be achieved in substantially the same way, by increasing the opposite-phase component determined by the differential constant $\tau$ and/or $\tau'$. Thus, the flow chart in FIG. 10 shows that the steps 34, 35 in FIG. 4 are replaced by steps 64, 65, respectively, and the flow chart in FIG. 11 similarly shows that the steps 34, 35 are replaced by steps 74, 75, respectively.

In the case of the flow chart shown in FIG. 10, the weighting factors $f_2$, $f_3$ are looked-up in the step 64 according to the steering wheel operating angle $\theta$ on the basis of the table data corresponding to FIG. 5. These weighting factors $f_2$, $f_3$ are each gradually increased in accordance with increase in the steering wheel operating angle $\theta$ within the region of $\theta > \theta_0$. In the next step 65, the rear wheel steering angle $\delta_r$ is obtained by calculating the following equation which is made by incorporating the weighting factors $f_2$, $f_3$ to the equation (1) described above.

$$\delta_r = \delta_f \cdot \frac{K + f_2 \cdot \tau \cdot S + f_3 \cdot \tau' \cdot S^2}{1 + T \cdot S} \quad (6)$$

In this case, the differential component or the opposite-phase component of the rear wheel steering angle determined by the differential constants $\tau$, $\tau'$, is increased in the region of $\theta > \theta_0$ upon increase in the steering wheel operating angle $\theta$. Consequently, when a vehicle is turned round in the region of $\theta > \theta_0$ or in the front wheel large steering condition, the turning-round property and maneuverability of the vehicle can be improved to an amount commensurate with the front wheel large steering angle, thereby to achieve the intended functions.

In the example shown in FIG. 11, all of the above-mentioned weighing factors $f_1$, $f_2$, $f_3$ are utilized. In the step 74, the weighting factors $f_1$, $f_2$, $f_3$ are looked-up according to the steering wheel operating angle $\theta$ on the basis of the table data corresponding to FIG. 5. In the next step 75, the rear wheel steering angle $\delta_r$ is obtained by the calculation of the following equation.

$$\delta_r = \delta_f \cdot \frac{f_1 \cdot K + f_2 \cdot \tau \cdot S + f_3 \cdot \tau' \cdot S^2}{1 + T \cdot S} \quad (7)$$

In this case, the proportional component and the differential component of the rear wheel steering angle $\delta_r$ are corrected in the region of $\theta > \theta_0$ so as to provide an improved turning-round property of a vehicle. Therefore, under the front wheel large steering condition corresponding to $\theta > \theta_0$ and requiring a sufficient turning-round property, the rear wheel steering does not degrade the required property, making it possible to achieve a satisfactory maneuverability of the vehicle.

As explained above, the rear wheel steering system according to the present invention is composed such that at least one of the proportional component and the differential component of the rear wheel steering is corrected under a front wheel large steering condition corresponding to $\theta > \theta_0$, in a direction to improve the transient turning response characteristic of the vehicle. Consequently, the present invention provides a remarkable functional advantage that the turning-round property and maneuverability of the vehicle can be positively prevented from undesirable degradation even when the rear wheels are steered under the front wheel large steering condition.

I claim:

1. A rear wheel steering system of an automotive vehicle wherein steering of rear wheels is conducted in accordance with front wheel steering, with a steering angle which corresponds to a sum of proportional and differential components of the amount of said front wheel steering, said rear wheel steering system comprising:
   a detecting means for detecting a front wheel large steering condition in which the front wheels have been steered with an amount in excess of a preset value;
   a correction means responsive to said detecting means, for correcting at least one of the proportional component and the differential component in said front wheel large steering condition, in such a direction so as to improve a transient turning response characteristic of the vehicle; and
   an actuator means responsive to said correction means, for steering the rear wheels by a steering angle based on said at least one of the components which has been corrected by the correcting means in said large front wheel steering condition;
   wherein said correction means decreases said proportional component when it is a same-phase component, in accordance with an increase in the amount of the front wheel steering.

2. A rear wheel steering system as set forth in claim 1, wherein said correction means changes said proportional component into an opposite-phase component, when said front wheels are steering with an amount in excess of a predetermined value.

3. A rear wheel steering system as set forth in claim 2, wherein correction of said proportional component by said correction means is carried out by selecting a proportional constant for determining a basic magnitude of said proportional component, and multiplying said proportional constant by a weighting factor.

4. A rear wheel steering system as set forth in claim 1, wherein correction of said proportional component by said correction means is carried out by selecting a proportional constant for determining a basic magnitude of said proportional component, and multiplying said proportional constant by a weighting factor.

5. A rear wheel steering system of an automotive vehicle wherein steering of rear wheels is conducted in accordance with front wheel steering, with a steering angle which corresponds to a sum of proportional and differential components of the amount of said front wheel steering, said rear wheel steering system comprising:
   a detecting means for detecting a front wheel large steering condition in which the front wheels have been steered with an amount in excess of a preset value;
   a correction means responsive to said detecting means, for correcting at least one of the proportional component and the differential component in said front wheel large steering condition, in such a direction so as to improve a transient turning response characteristic of the vehicle; and
   an actuator means responsive to said correction means, for steering the rear wheels by a steering angle based on said at least one of the components which has been corrected by the correcting means in said large front wheel steering condition;

wherein said correction means increases said proportional component when it is an opposite-phase component, in accordance with an increase in the amount of the front wheel steering.

6. A rear wheel steering system as set forth in claim 5, wherein correction of said proportional component by said correction means is carried out by selecting a proportional constant for determining a basic magnitude of said proportional component, and multiplying said proportional constant by a weighting factor.

7. A rear wheel steering system of an automotive vehicle wherein steering of rear wheels is conducted in accordance with front wheel steering, with a steering angle which corresponds to a sum of proportional and differential components of the amount of said front wheel steering, said rear wheel steering system comprising:

a detecting means for detecting a front wheel large steering condition in which the front wheels have been steered with an amount in excess of a preset value;

a correction means responsive to said detecting means, for correcting at least one of the proportional component and the differential component in said front wheel large steering condition, in such a direction so as to improve a transient turning response characteristic of the vehicle; and an actuator means responsive to said correction means, for steering the rear wheels by a steering angle based on said at least one of the components which has been corrected by the correcting means in said large front wheel steering condition;

wherein said correction means corrects said differential component which is a sum of first order and second order differential components of the amount of said front wheel steering.

8. A rear wheel steering system as set forth in claim 7, wherein said correction means increases said differential component when it is an opposite-phase component, in accordance with an increase in the amount of the front wheel steering.

* * * * *